June 5, 1934.  F. M. PATTERSON  1,961,448
STEAM TRAP
Filed July 18, 1929   2 Sheets-Sheet 1
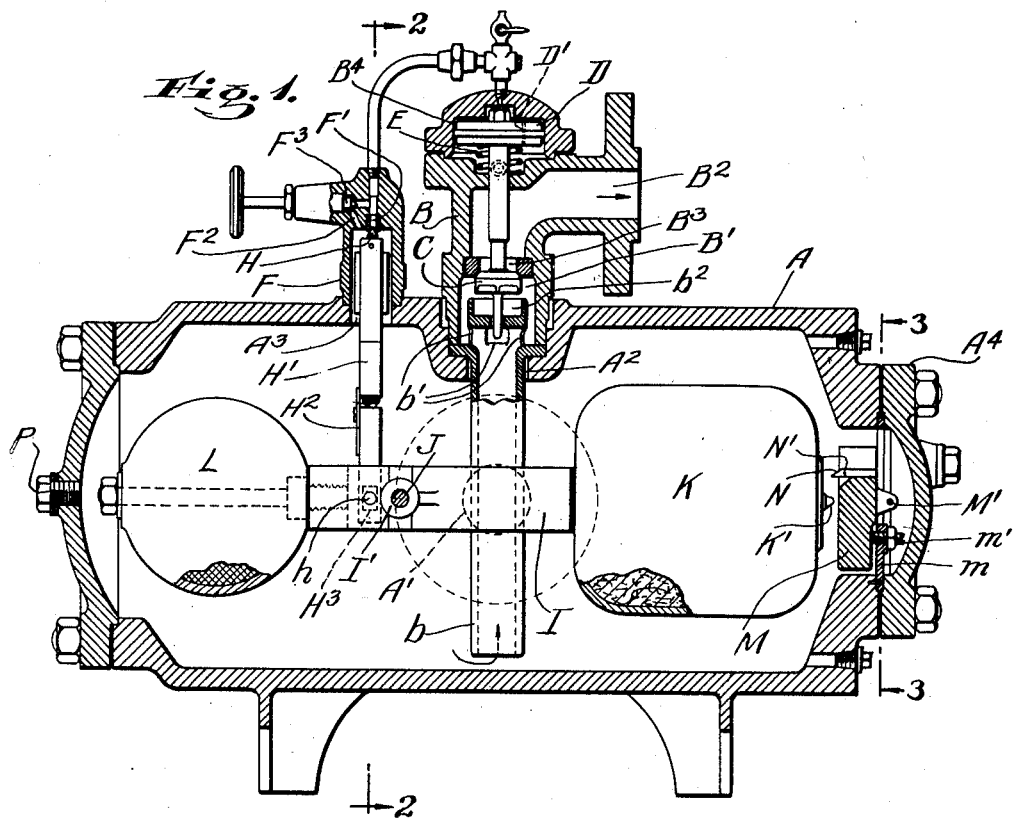
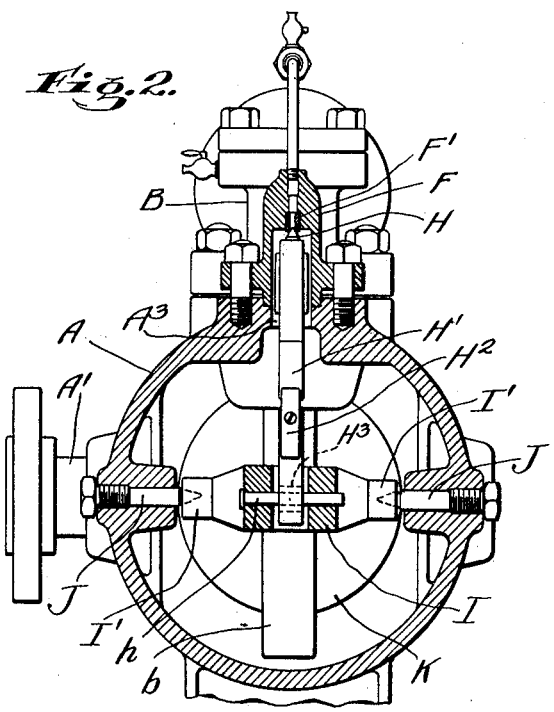
INVENTOR.
FRANKLIN M. PATTERSON
BY John E. Hubbell
ATTORNEY

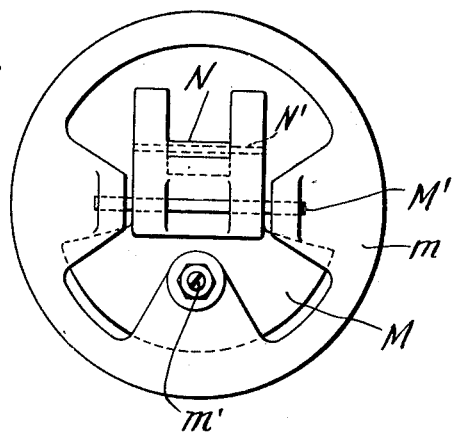
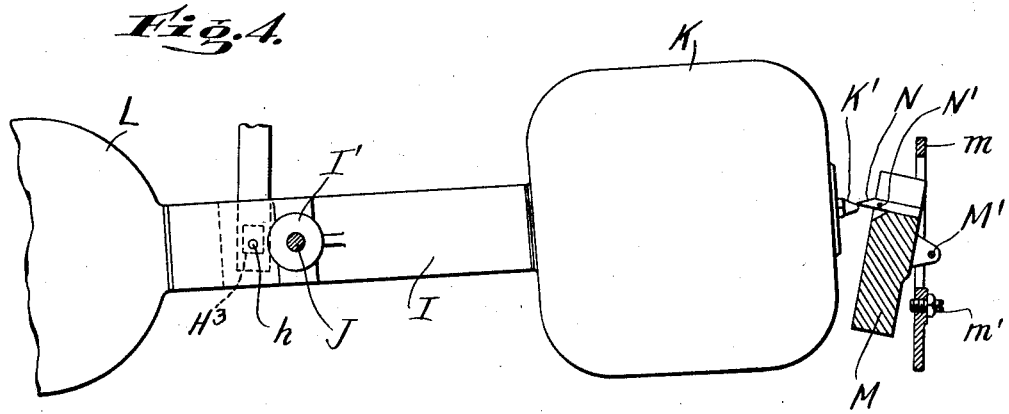
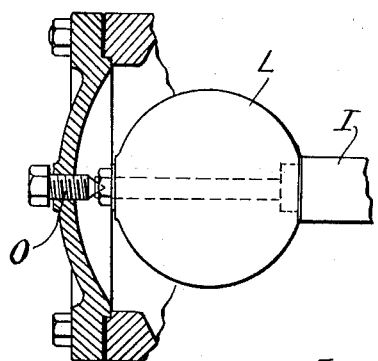

Patented June 5, 1934

1,961,448

UNITED STATES PATENT OFFICE 1,961,448

STEAM TRAP

Franklin M. Patterson, Pitman, N. J., assignor to Cochrane Corporation, Philadelphia, Pa., a corporation of Pennsylvania Application July 18, 1929, Serial No. 379,104

10 Claims. (Cl. 137—103)

The general object of my present invention is to provide a steam trap for collecting and intermittently discharging condensate from steam piping or other steam apparatus, of improved construction, and characterized in particular by its novel and effective provisions for opening the discharge valve of the trap whenever a predetermined amount of liquid accumulates in the trap, and for subsequently closing the valve when the liquid previously accumulated in the trap has been discharged, without valve wire drawing or chattering, notwithstanding wide fluctuations in the rate at which condensate is collected and discharged, and even though the steam pressure admitted to the trap is relatively high. The trap was devised and is adapted for use with steam piping or other apparatus in which the steam pressure is high in the modern acceptance of the term high steam pressure; that is to say, in which the steam pressure is a thousand or twelve hundred pounds per square inch or so.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of the invention.

On the drawings:—

Fig. 1 is an elevation in section on the line 1—1 of Fig. 2;

Fig. 2 is a section on the line 2—2 of Fig. 1;

Fig. 3 is a partial section on the line 3—3 of Fig. 1;

Fig. 4 is a diagrammatic elevation of a portion of the apparatus with the parts in different positions from those shown in Figs. 1 and 2; and Fig. 5 is a partial section taken similarly to Fig. 2, illustrating means for securing parts against movement during transportation.

The trap shown in the drawings comprises a chambered casing or body A, having an inlet A' through which condensate and steam enter the casing, and an opening $A^2$ in which the discharge valve fitting B is mounted. The latter comprises a pipe-like part $b$ which extends downwardly into proximity with the bottom of the chamber in the casing A and which communicates at its upper end through lateral ports $b'$ with the discharge valve inlet chamber B'. The latter communicates with the discharge chamber $B^2$ of the valve through a port $B^3$ controlled by the discharge valve C, which is movable axially of the port $B^3$.

The valve C is normally held in its closed position by the fluid pressure within the casing A acting against the inner side of the valve, the closing action of the fluid pressure being supplemented by the action of a spring E. The valve C is opened by the action of fluid pressure against a piston D to which the stem of the valve C is connected. The piston D works in a piston chamber $B^4$ formed in the discharge valve fitting, and the spring E acts between the side of the piston adjacent the valve C and the corresponding end of the piston chamber $B^4$. Fluid under pressure for opening the valve C is supplied to the upper end of the chamber $B^4$ from the trap casing through a conduit connection including a pilot valve casing F which is mounted in an opening $A^3$ in the trap casing and is formed with a port F' controlled by a pilot valve member H.

The pilot valve member H is automatically moved to open and close the port F' as the liquid level in the casing A respectively rises to an upper limit, and falls to a lower limit by means comprising a float lever I located within, and pivotally connected to the trap casing A. The pivotal mounting for the float lever I comprises trunnion extensions I' from the lever which are formed with bearing seats entered by the ends of pivot pin members J threaded through the opposing walls of the casing A. A float K is secured to one end, and, as shown, a counterbalance L is secured to the other end of the lever I. The pilot valve H, which may be a ball valve, though, as shown, it is of conical form, is connected to the float lever I by a valve stem. Advantageously, the latter is made adjustable in length, and for that reason is formed as shown of end to end sections, one of which has a threaded extension H' screwed into a threaded socket formed in the other section. A removable locking part $H^2$ normally prevents relative rotation of the two stem sections. The lower section is formed with a transverse or slot opening $H^3$ loosely receiving a pivot pin $h$ carried by the lever I. The opening $H^3$ is vertically elongated to permit the lever I to turn in the valve opening direction without opening the valve H, when the latter is closed, until the float K reaches the upper limit of its movement, and to turn in the valve closing direction without seating the valve H, when the latter is open, until the float reaches the lower limit of its movement. The fluid pressure in the casing A tends to maintain the valve H in its closed position so long as the valve is in engagement with its seat.

During each period of operation in which liquid is accumulating in the trap, the valves C and H are held in their closed positions until, as a result of the rise of liquid level in the trap, the resultant upward movement of the float K turns the lever I into the position in which the pin $h$ engages the lower end of the slot $H^3$ and pulls the valve H away from its seat. As soon as the valve H is pulled away from its seat, the fluid pressure on the valve H is equalized, and gravity then immediately moves the valve into its wide open position, in which the upper end wall of the slot $H^3$ engages the pin $h$. To augment this gravital action, the valve H and its stem are advantageously made quite heavy. When the valve H is moved away from its closed position, pressure fluid flows from the casing A through the conduit including the port $F'$ into the piston chamber $B^4$. This promptly opens the valve C as the area of the piston D is appreciably greater than the area of the valve C. The part $b$ is formed with an open ended chamber $b^2$ receiving the valve C as the latter approaches its wide open position. The chamber $b^2$ shields the valve C from the erosive action of the discharging fluid and also cushions the final opening movement of the valve. When the valve C is opened, the liquid previously accumulated in the trap discharges and the float K descends. When the trap is nearly empty, the float K reaches the lower limit of its movement and thereby returns the valve H to its closed position. When this occurs, the valve C promptly closes in consequence of the reduction in fluid pressure acting against the upper side of the piston D which results from leakage past the piston D which ordinarily is formed with a restricted passage $D'$ to insure the proper amount of lakage for this purpose. The initial closing movement of the valve C is effected by the spring E.

As soon as the valve C approaches its seat, the pressure in the trap becomes effective to complete the closing movement of the valve and to thereafter hold the latter on its seat until pressure is again supplied to the chamber $B^4$ to open the valve.

To secure prompt and positive operation of the pilot valve H, as is necessary to avoid chattering of, or wire drawing past, the valves C and H, particularly in high pressure operation, the net flotative force acting on the lever I should be of substantial magnitude. In high pressure operation, the float K if in the form of a hollow metal body filled with air, is apt to collapse, and leakage through the wall of such a hollow metal body is apt to occur, particularly if the latter is made of cast iron as is desirable from the standpoint of cost, and also because of the capacity of cast iron to resist the corrosive action of steam and alkaline water at high pressures. Difficulties of the character referred to may be avoided in accordance with the present invention, by making the float K a shell of cast iron filled with concrete or analogous material not adversely effected by steam and water of condensation under high pressure and which is of a density relatively low in comparison with the average density of the counter-balance weight L which may consist of a shell of cast iron filled with lead. In lieu of the materials specified, I sometimes form the float K of aluminum, and the weight L of bronze.

By suitably proportioning float and counterbalance parts formed as described, any practically desirable flotative effect may be secured. In one practical design of apparatus of the form shown, the force acting on the valve H tending to pull the latter from its seat when the water rises to the desired maximum level amounts to approximately ninety pounds, and the lesser force required to reseat the valve H after the trap has emptied amounts approximately to thirty pounds. It will be understood, of course, that the forces stated are given by way of example of one practical embodiment of the invention, and that they may be very different in other embodiments. The formation of the float K out of material much heavier than the water which it displaces and the use in conjunction therewith of a heavy counterbalance weight L gives the float lever I considerable inertia, and augments the force available to move the valve H off its seat under heavy load conditions in which the condensate level in the trap rises rapidly. An increase in the inertia of the float lever also increases the force available to reseat the valve H when an increase in trap pressure increases the rate of trap discharge and makes prompt closing of the valve of increased importance.

The operation of the apparatus insofar as it has been described, has been found highly effective in practice except under conditions in which the condensate level in the trap rises very slowly. In such case, a tendency to wire drawing past the valve H and consequently past the valve C also sometimes develops. This difficulty is avoided by the addition to the apparatus already described of means, shown as including a member M, which acts on the float lever to retard the rising movement of the float K as the latter approaches its upper position, and then yields, as the condensate reaches the desired upper maximum level, so that the final rising movement of the float K is relatively rapid and is independent of the rate at which the condensate level rises. As shown, the member M is in the form of a relatively heavy body of cast iron pivotally supported by a pivot pin $M'$ and provided with a projection N which is engaged by a projection $K'$ of the float K as the latter rises. The parts are so disposed that the float projection $K'$ cannot move upward past the projection N without first imparting a tilting movement (see Fig. 4) to the member M. The center of gravity of the latter is laterally displaced from the pivot pin $M'$ so that the major portion of the weight of the member M opposes the tilting movement of the member necessary to permit the projection $K'$ to move past the projection N.

As shown, the pivot pin $M'$ for the member M is carried by ear portions of an apertured plate $m$ clamped between the end of the trap casing body A and the corresponding removable end head $A^4$. The exact position of the member M, when at rest, is determined by an adjustable abutment screw $m'$ threaded through the plate $m$. To prevent interference with the descending movement of the float K, the projection N is in the form of a detent pivoted to the member M at $N'$ to turn counter-clockwise, but not clockwise relative to the member M from the position shown in Fig. 1.

Preferably, the trap has suitable provisions by which the discharge valve C may be normally opened whenever this is necessary for test or other purposes, even though the float K is below its valve opening position. To this end the pilot valve casing F is formed with a by-pass passage F² about the port F'. The passage F² is controlled by a manually adjusted valve F³ which is normally closed but which, when open, permits the pressure in the trap to be transmitted to the piston chamber B⁴ so that the valve C may thus be opened without moving the valve H off its seat. Because of the considerable weight of the float lever and the float and counter-balance attached thereto, it is desirable to secure the float lever against movement relative to the trap casing in the transportation of the trap. To this end, one or more float locking pins O may be screwed through threaded openings formed in the wall of the trap casing and extend into engagement with the float lever as shown in Fig. 5. When the trap is put in service each locking screw O is replaced by a shorter threaded plug P which can be made effective to prevent leakage through the threaded openings in which it is placed notwithstanding the high internal trap pressure.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:—

1. In a steam trap, having a chamber with an inlet to receive fluid under pressure and an outlet for the discharge of liquid accumulating in said chamber, a discharge valve controlling said outlet, fluid pressure operating mechanism for said valve including an unbalanced pilot valve within said chamber and normally held in its closed position by the pressure within said chamber and means for moving said pilot valve between its open and closed positions comprising a float device of relatively large inertia arranged for pivotal movement in the pilot valve opening or closing direction accordingly as the liquid level in said chamber rises or falls, and means engaged by said float device after a predetermined rise in said level and retarding further movement of said device in the valve opening direction and rendered ineffective to prevent the rapid completion of the movement of said device in the valve opening direction by a further rise in said liquid level.

2. A high pressure steam trap comprising a casing having an inlet and an outlet, a valve controlling said outlet, and controlling means for said valve including an unbalanced pilot valve within said casing normally held in its closed position by the pressure within said casing, and means for moving said pilot valve between its open and closed positions in accordance with changes in liquid level in said casing comprising a float lever turning about a fulcrum and displacement bodies of different specific gravities mounted on said lever at opposite sides of said fulcrum and adapted to subject said lever to a torque changing in magnitude and direction as the liquid level in said casing rises and falls and to give said lever a relatively large inertia, and means for subjecting said lever to a yielding force opposing the motion of the lever during a portion of the movement of the latter in the valve opening direction which terminates immediately prior to the completion of such movement.

3. A high pressure steam trap comprising a casing having an inlet and an outlet, a valve controlling said outlet, and controlling means for said valve including a float lever turning about a fulcrum and displacement bodies of different specific gravities each of which is in excess of that of water, mounted on said lever at opposite sides of said fulcrum and adapted to subject said lever to a torque changing in magnitude and direction as the liquid level in said casing rises and falls and to give said lever a relatively large inertia, and means for subjecting said lever to a yielding force opposing the motion of the lever during a portion of the movement of the latter in the valve opening direction which terminates immediately prior to the completion of such movement.

4. A high pressure steam trap comprising a casing having an inlet and an outlet, a valve controlling said outlet, and controlling means for said valve including a float lever turning about a fulcrum and displacement bodies of different specific gravities mounted thereon at opposite sides of said fulcrum and arranged to subject said lever to a torque varying in magnitude and direction as the liquid level in said casing rises and falls and to give said lever a relatively large inertia, and means adjustably mounted in said casing for engaging and holding said lever and displacement bodies fixed relative to said casing.

5. A high pressure steam trap comprising a casing having an inlet and an outlet, a valve controlling said outlet, and controlling means for said valve including a float lever turning about a fulcrum and displacement bodies of different specific gravities mounted thereon at opposite sides of said fulcrum and arranged to subject said lever to a torque varying in magnitude and direction as the liquid level in said casing rises and falls and to give said lever a relatively large inertia, and means for subjecting said lever to a yielding force opposing the motion of the lever during a portion of the movement of the latter in the valve opening direction and terminating immediately prior to the completion of said movement, said means comprising a weight element movable along a path diverging from the path of movement of said lever, a pawl carried by said weight and operatively engaging said lever at a predetermined point in the rising movement of the latter and disengaging from said lever as a result of the divergence of the paths of movement of said lever and weight element when said lever reaches a second predetermined point in its upward movement, said pawl being movable relative to said weight element to permit the free return movement of said lever.

6. A steam trap comprising a casing having fluid inlet and outlet passages, a vertically movable valve controlling said outlet passage and adapted to be held in its seated position by the fluid pressure in said casing, a float lever moved by changes in liquid level in said casing, and a valve stem providing a lost motion connection between said valve and lever, said float lever being adapted to subject said valve through said connection to a valve opening impulse which is substantially independent of the rate of change in the liquid level in said casing when said level rises to a predetermined height, and said valve and stem being of sufficient weight to insure a rapid gravital movement of said valve when said valve is moved from its seated position.

7. A steam trap comprising a casing having fluid inlet and outlet passages, a vertically movable pilot valve controlling said outlet passage and adapted to be held in its seated position by the fluid pressure in said casing, a float lever moved by changes in liquid level in said casing, and a slotted pilot valve stem providing a lost motion connection between said valve and float lever, said float lever being adapted to subject said valve through said connection to a valve opening impulse which is substantially independent of the rate of change in the liquid level in said casing when said level rises to a predetermined height, and said valve and stem being of sufficient weight to insure a rapid and substantial gravital movement of said valve when said valve is moved from its seated position by said float lever.

8. A high pressure steam trap comprising a casing having fluid inlet and outlet passages, a vertically movable valve for controlling said outlet passage and adapted to be held in its seated position by the fluid pressure in said casing, a float lever vertically movable about a fulcrum as the liquid level in said casing rises and falls, a valve stem connecting said valve and lever and having a vertical movement greater than the vertical movement of the portion of said lever to which it is connected, said float lever being adapted to subject said valve stem to a valve opening impulse which is substantially independent of the rate of change in the liquid level in said casing when said level rises to a predetermined height and said valve being sufficiently weighted to insure a rapid and substantial gravital movement thereof when slightly moved from its seated position.

9. A high pressure steam trap comprising a casing having fluid inlet and outlet passages, a vertically movable valve for controlling said outlet passage and adapted to be held in its seated position by the fluid pressure in said casing, a float lever vertically movable about a fulcrum as the liquid level in said casing rises and falls, displacement bodies mounted on said lever at opposite sides of said fulcrum and adapted to subject said lever to a torque changing in magnitude and direction as the liquid level in said casing rises and falls, a valve stem depending from said valve and having a lost motion connection with said lever, and said valve and stem being of sufficient weight to insure a rapid and substantial gravital movement thereof when said valve is moved from its seated position by said float lever.

10. A high pressure steam trap comprising a casing having fluid inlet and outlet passages, a main valve controlling said outlet passage, a vertically movable pilot valve for controlling the operation of said main valve and adapted to be held in its seated position by the fluid pressure in said casing, a float lever vertically movable about a fulcrum, displacement bodies of different specific gravities mounted on said lever at opposite sides of said fulcrum and adapted to subject said lever to a torque changing in magnitude and direction as the liquid level in said casing rises and falls and to give said lever a relatively large inertia, a valve stem depending from said pilot valve and having a lost motion connection with said lever, and means opposing the valve opening movement of said lever as said lever rises but yielding to permit the rapid completion of said movement when said level reaches a predetermined height, said pilot valve and stem being of sufficient weight to insure a rapid and substantial gravital movement thereof when said pilot valve is moved from its seated position by said float lever.

FRANKLIN M. PATTERSON.